United States Patent Office 3,658,709
Patented Apr. 25, 1972

---

3,658,709
GREASE COMPOSITIONS OF PERFLUOROOLEFIN EPOXIDE POLYETHERS
John B. Christian, Yellow Springs, Ohio, assignor to the United States of America as represented by the Secretary of the Air Force
No Drawing. Filed Sept. 15, 1967, Ser. No. 668,236
The portion of the term of the patent subsequent to Aug. 25, 1987, has been disclaimed
Int. Cl. C10m 7/30
U.S. Cl. 252—51.5 R         1 Claim

ABSTRACT OF THE DISCLOSURE

Grease formulations of by weight 65 to 93% perfluoroolefin epoxide polyether liquids with thickeners 19 to 24% triazine, 7 to 10% spherical boron nitride of 0.05 to 0.5 micron diameter, and 20 to 35% fluorinated ethylene propylene copolymer powder, stable at temperatures up to 600° F.

BACKGROUND OF THE INVENTION

In the art of lubrication and, particularly, of lubricants having sufficient dimensional stability to give them grease-like qualities or to classify them as greases advancing technology is constantly demanding performance over wider temperature ranges and under a variety of hitherto unencountered environmental conditions and extremes. In aerospace engineering for example, extremely high temperatures such as those encountered upon atmospheric re-entry must be accommodated and lubricity must be maintained by a grease-like substance which will keep its dimensional stability and, hence its association with the parts to be lubricated at high temperatures and high speeds. In the almost complete vacuum of outer space, lubricants are required which can maintain their grease-like consistency and lubricating capacity under extremely low pressure and at very low temperatures. In aerospace launch vehicles, particularly those employing liquid oxygen as part of the combustion system, explosion resistance and impart in the presence of the liquid oxygen is an important property of the greases employed.

While significant breakthroughs are being regularly made with regard to lubricating fluids to meet these increasingly demanding situations, the improvements in the fluids themselves have not been capable of being carried over into greases incorporating them. Consequently, while advancement in lubrication is generally moving forward, the art of grease formulation is not keeping pace.

Cases in point are the recently discovered perfluoroolefin epoxide polyethers which have been polymerized in a liquid state and have shown considerable promise as lubricating fluids. Attempts to utilize these liquids as a base for grease compositions are also proving to be promising.

SUMMARY OF THE INVENTION

The present invention relates to grease formulations based upon perfluoroolefin epoxide polyether lubrication fluids.

It is accordingly an object of this invention to provide an improved grease formulation for operation over a wide temperature range and under exposure to a variety of abnormal or extreme environmental situations.

Still another object of the present invention is to provide such a grease formulation that will perform for prolonged periods of exposure to hyperthermal environments.

Yet another object of the invention is to provide a grease composition which will remain grease-like and continue to perform its lubricating functions in substantial vacuums on the order of that encountered in outer space.

Yet another object of the present invention is to provide a grease formulation which is based upon and can thereby utilize in greases the desirable properties of the fluid perfluoroolefin epoxide polyethers.

These and other objects and advantages which will appear from a reading of the following disclosure are achieved according to this invention by the employment of that class of materials which consists of triazine, fluoroethylene and boron nitride as grease-thickening additives to the perfluoroolefin epoxide polyethers. The triazine may be technical grade powder form manufactured and sold under the trade name, "Ammeline,' by the American Cyanimide Company; the fluoroethylene may be any of the tetrafluoroethylene or trichlorotrifluoroethylene polymers or co-polymers; and the boron nitride is in spherical particles of a size ranging from 0.05 to 0.5 micron in diameter. It has been found that optimum results are achieved where the triazine powders are employed in weight ratios of from nineteen to twenty-four parts to form eighty-one to seventy-six parts of the perfluoroolefin epoxide polyether liquids; whereas the fluoroethylene polymers may be employed in greater percentage of up to thirty-five weight percent of the total grease composition. The spherical boron nitride particles on the other hand are employed in a smaller percentage ranging from seven to ten weight percent of the total grease formulation.

The perfluoroolefin epoxide polyethers employed in specific embodiments of the within invention have comprised those which have the following structures:

(1) $X-CF_2-CF_2-O+CF(X)-CF_2-O+_nCF_2-X$

Where $n$ is a positive integer including zero and represents the number of $-CF(X)-CF_2-O-$ units in the molecule and where X is a member of the class consisting of fluorine and the perfluoromethyl radical.

(2)

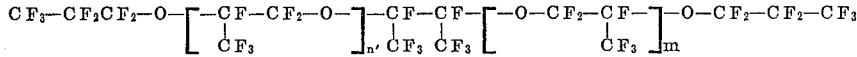

Where $n'$ and $m$ are positive integers of at least 2.

The triazine employed in specific embodiment of the invention has comprised of 2,4-diamino-6-hydroxy-1,3, 5-triazine which has the structure

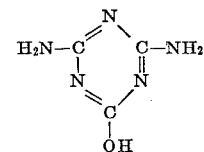

In one embodiment of this invention a grease formulation was made by utilizing 79 parts by weight of perfluoroolefin polyether liquid and 21 parts by weight of the triazine thickener. After these ingredients were thoroughly mixed, first by spatula blending and then by milling several passes through a 3-roll mill, the mixture was subjected to conventional testing with the following results. On the ASTM D217-60T unworked penetration cone drop test, a value of 260 was achieved; and, after working the cone sixty strokes in the test device, a worked penetration reading of 275 was achieved. In a standard Pope Spindle bearing test wherein the bearings were loaded with five pounds and operated at 10,000 revolutions per minute, the grease performed and allowed the test to continue demonstrating satisfactory lubricity for 1760 hours at temperatures of 500° Fahrenheit, for 240 hours at 550° Fahrenheit and for 160 hours at 600° Fahrenheit.

In another example wherein seventy-six parts by weigh of the perfluoroolefin epoxide polyether liquid and twenty-four percent of the triazine thickener were combined in a grease formulation, the same unworked penetration test gave a value of 331 while the worked penetration value was 324. In the same five-pound loaded bearing test at 10,000 revolutions per minute, the grease performed as a lubricant for more than 1,000 hours at 500° Fahrenheit, for 390 hours at 550° Fahrenheit and for 190 hours at 600° Fahrenheit. When this same formulation was applied to the same bearing test under a three-pound load at 10,000 revolutions per minute but in a vaccum of $10^{-9}$ millimeters of mercury at 300° Fahrenheit, the apparatus functioned properly for more than 5,000 hours and when the load was increased to twenty-five pounds under the same revolutions and vacuum conditions, the grease functioned properly for more than 3,000 hours indicating its satisfactory performance under the vacuum condition existing in outer space.

In still another example where the perfluoroolefin epoxide polyether liquid comprised seventy-seven percent of the formulation and the triazine thickener 23 parts by weight, the unworked penetration value was 275 while the worked penetration was 256. While this grease allowed operation for only 120 hours at 600° Fahrenheit in the bearing test under five pounds loading at 10,000 revolutions per minute, the test life was actually increased to 190 hours at 600° Fahrenheit were the load was increased from five to from twenty-five to fifty pounds at the same 10,000 revolutions per minute. At 450° Fahrenheit at five pound loading and 20,000 revolutions per minute, the test apparatus was able to run for 290 hours; and when the same temperature and loading were maintained while the revolutions per minute were increased to 30,000, adequate lubricity was provided for twenty-one hours.

In a grease formulation comprising seventy weight percent of the perfluoroolefin epoxide polyester and thirty percent of the fluorinated ethylene propylene co-polymer the bearing test under five pounds load at 10,000 revolutions per minute ran for 780 hours at 500° Fahrenheit and only 170 hours at 550° Fahrenheit; but the unworked penetration as measured on the ASTM penetrometer gave a value of 290, and a worked penetration after sixty strokes in the penetrometer yielded a reading of 275 indicating that grease-like consistency and grease-like performance were obtained.

When ninety parts by weight of the perfluoroolefin epoxide polyether liquid and ten percent by weight of the boron nitride in spherical particulate form was employed again the ASTM D217-60T penetrometer test showed an unworked penetration value of 329 and a worked penetration value of 366 indicating that, although it was not as thick, a grease-type formulation was obtained.

In a related formulation based upon the spherical boron nitride particles where they represent seven percent by weight of the total grease and perfluoroolefin epoxide polyether liquid represents ninety-three weight percent of the total formulation, a grease-like consistency is achieved capable of performing substantially as does the mixture composed of the fluid and thickener in the ratio of nine to one. Tests conducted on the formulation containing only seven percent of the spherical boron nitride particles, however, according to U.S. Air Force Specification Bulletin No. 527, produced a reading of more than eighty foot-pounds indicating that this formulation possesses excellent explosion resistance upon impact in the presence of liquid oxygen. In view of this particular property, these grease formulations, of course, offer considerable promise for use in aerospace launch vehicles for example wherein liquid oxygen is employed in the combustion system. Beyond this, the availability of boron nitride thickened perfluoroolefin epoxide polyether greases for use at temperatures on the order of from 400° to 500° Fahrenheit is demonstrated by the fact that, on the Pope Spindle Bearing Test, when the bearings were lubricated by this formulation, loaded at five pounds and operated at 10,000 revolutions per minute, grease-like consistency and lubricity were maintained for over 2400 hours at 400° Fahrenheit and for over 300 hours at 500° Fahrenheit.

While the within invention has been described in considerable detail in connection with certain specific examples and embodiments thereof, it is to be understood that the foregoing particularization and detail have been for the purposes of illustration only and do not limit the scope of the invention as defined in the subjoined claim.

What I claim is:

1. A grease composition consisting essentially of (1) 76 to 81 weight percent of a base oil selected from the group of perfluoroolefin epoxide polyethers having the following structural formulas:

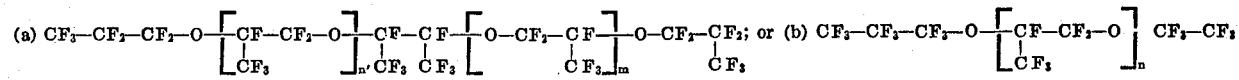

$m$ are positive integers of at least 2 and $n$ is a positive integer; and (2) 19 to 24 weight percent 2,4-diamino-6-hydroxy-1,3,5-triazine.

References Cited
UNITED STATES PATENTS 3,505,229   4/1970   Skehan _____ 252—54

DANIEL E. WYMAN, Primary Examiner

I. VAUGHN, Assistant Examiner

U.S. Cl X.R.

252—54